(12) United States Patent
Garay et al.

(10) Patent No.: US 11,308,429 B2
(45) Date of Patent: Apr. 19, 2022

(54) ENTERPRISE DATA MINING SYSTEMS

(71) Applicant: ServiceNow, Inc., Santa Clara, CA (US)

(72) Inventors: Ivan Rodrigo Garay, Santa Clara, CA (US); Erick Koji Hasegawa, Redwood City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 150 days.

(21) Appl. No.: 16/255,649

(22) Filed: Jan. 23, 2019

(65) Prior Publication Data

US 2020/0234212 A1    Jul. 23, 2020

(51) Int. Cl.
*G06Q 10/00* (2012.01)
*G06Q 10/06* (2012.01)
*G06F 16/2458* (2019.01)

(52) U.S. Cl.
CPC ... *G06Q 10/06316* (2013.01); *G06F 16/2465* (2019.01); *G06Q 10/0633* (2013.01); *G06F 2216/03* (2013.01)

(58) Field of Classification Search
None
See application file for complete search history.

(56) References Cited

U.S. PATENT DOCUMENTS

| | | | | |
|---|---|---|---|---|
| 5,560,011 A | * | 9/1996 | Uyama | G06F 9/44 706/11 |
| 6,522,768 B1 | * | 2/2003 | Dekhil | G06K 9/00 382/100 |
| 6,609,122 B1 | | 8/2003 | Ensor | |
| 7,020,706 B2 | | 3/2006 | Cates | |
| 7,023,979 B1 | * | 4/2006 | Wu | H04M 3/5233 379/265.11 |
| 7,028,301 B2 | | 4/2006 | Ding | |
| 7,062,683 B2 | | 6/2006 | Warpenburg | |
| 7,110,525 B1 | * | 9/2006 | Heller | H04M 3/523 379/265.11 |
| 7,131,037 B1 | | 10/2006 | LeFaive | |
| 7,170,864 B2 | | 1/2007 | Matharu | |
| 7,350,209 B2 | | 3/2008 | Shum | |

(Continued)

OTHER PUBLICATIONS

Aksin, Zeynep, Mor Armony, and Vijay Mehrotra. "The Modern Call Center: A Multi-Disciplinary Perspective on Operations Management Research." Production and Operations Management 16.6 (2007): 665-688. (Year: 2007).*

(Continued)

*Primary Examiner* — Gurkanwaljit Singh
(74) *Attorney, Agent, or Firm* — Fletcher Yoder PC

(57) ABSTRACT

Suggesting an optimal set of actions includes receiving an incident notification and an indication of a first agent for the incident notification from a remote device, determining an assigned agent for the incident notification and a first incident type associated with the incident notification, determining an agent role for the first agent, selecting an optimal set of actions based on the first incident type and the agent role, wherein the optimal set of actions are selected from a subset of historic recorded agent interactions from a plurality of records associated with the incident type, and provide for presentation the optimal set of actions to the first agent.

18 Claims, 9 Drawing Sheets

(56) References Cited

U.S. PATENT DOCUMENTS

| | | | |
|---|---|---|---|
| 7,610,512 B2 | 10/2009 | Gerber | |
| 7,617,073 B2 | 11/2009 | Trinon | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,826,597 B2* | 11/2010 | Berner | H04M 3/5166 379/1.01 |
| 7,890,209 B2 | 2/2011 | Gerber | |
| 7,925,981 B2 | 4/2011 | Pourheidari | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,073,731 B1* | 12/2011 | Rajasenan | G06Q 10/0637 705/7.42 |
| 8,224,683 B2 | 7/2012 | Manos | |
| 8,266,096 B2 | 9/2012 | Navarrete | |
| 8,311,863 B1* | 11/2012 | Kemp | G06Q 10/0639 705/7.11 |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,781,882 B1* | 7/2014 | Arboletti | G06Q 10/0639 705/7.39 |
| 8,789,053 B2* | 7/2014 | Howard | G06F 9/5072 718/100 |
| 8,832,652 B2 | 9/2014 | Mueller | |
| 8,887,133 B2 | 11/2014 | Behnia | |
| 8,976,955 B2* | 3/2015 | Liberman Ben-Ami | H04M 3/5191 379/265.09 |
| 9,065,783 B2 | 6/2015 | Ding | |
| 9,098,322 B2 | 8/2015 | Apte | |
| 9,122,552 B2 | 9/2015 | Whitney | |
| 9,239,857 B2 | 1/2016 | Trinon | |
| 9,317,327 B2 | 4/2016 | Apte | |
| 9,363,252 B2 | 6/2016 | Mueller | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,654,639 B1* | 5/2017 | Balarajan | H04M 3/5183 |
| 9,766,935 B2 | 9/2017 | Kelkar | |
| 9,781,270 B2* | 10/2017 | Hollenberg | H04M 3/5233 |
| 9,792,387 B2 | 10/2017 | George | |
| 9,805,322 B2 | 10/2017 | Kelkar | |
| 10,061,867 B2* | 8/2018 | Lev | G06F 16/358 |
| 10,460,324 B1* | 10/2019 | Westen | G06F 11/0793 |
| 10,649,999 B2* | 5/2020 | Rogynskyy | G06F 16/122 |
| 10,733,556 B2* | 8/2020 | Bencke | G06N 20/20 |
| 10,742,649 B1* | 8/2020 | Hook, Jr. | H04L 63/0876 |
| 2001/0044735 A1* | 11/2001 | Colburn | G06Q 10/04 705/4 |
| 2005/0233733 A1* | 10/2005 | Roundtree | H04M 3/493 455/414.1 |
| 2006/0002540 A1* | 1/2006 | Kreiner | H04M 3/5233 379/265.02 |
| 2006/0229896 A1* | 10/2006 | Rosen | G06Q 10/1053 705/321 |
| 2007/0133780 A1* | 6/2007 | Berner | H04M 3/5166 379/265.01 |
| 2009/0190740 A1* | 7/2009 | Chishti | H04M 3/5158 379/265.06 |
| 2009/0190747 A1* | 7/2009 | Spottiswoode | H04M 3/5232 379/265.12 |
| 2009/0310764 A1* | 12/2009 | Gerhart | G06F 8/61 379/142.04 |
| 2010/0054452 A1* | 3/2010 | Afzal | H04M 3/5232 379/265.11 |
| 2010/0100412 A1* | 4/2010 | Cases | G06Q 10/0633 705/7.27 |
| 2011/0131247 A1* | 6/2011 | Brown | G06F 16/36 707/792 |
| 2012/0321072 A1* | 12/2012 | Dooley | H04M 3/5233 379/265.12 |
| 2013/0136253 A1* | 5/2013 | Liberman Ben-Ami | H04M 3/5191 379/265.09 |
| 2013/0216036 A1* | 8/2013 | Chishti | H04M 3/5238 379/265.11 |
| 2014/0278600 A1* | 9/2014 | Puthiyottil | G06Q 30/016 705/5 |
| 2014/0279352 A1* | 9/2014 | Schaefer | G06Q 40/04 705/37 |
| 2015/0281454 A1* | 10/2015 | Milstein | G06Q 10/063112 379/265.12 |
| 2015/0350430 A1* | 12/2015 | Nowak | H04M 3/5175 379/265.09 |
| 2016/0036981 A1* | 2/2016 | Hollenberg | H04M 3/5233 379/265.12 |
| 2016/0036982 A1* | 2/2016 | Ristock | G06Q 10/04 379/265.1 |
| 2016/0036983 A1* | 2/2016 | Korolev | H04M 3/5233 379/265.12 |
| 2016/0188672 A1* | 6/2016 | Lev | G06F 16/358 707/728 |
| 2016/0191709 A1* | 6/2016 | Pullamplavil | G10L 25/48 379/266.07 |
| 2016/0205250 A1* | 7/2016 | Loftus | H04M 3/5175 379/265.06 |
| 2016/0212266 A1* | 7/2016 | Soundar | H04M 3/51 |
| 2017/0098282 A1* | 4/2017 | Klemm | G06Q 30/016 |
| 2017/0103400 A1* | 4/2017 | Agarwal | G06Q 30/016 |
| 2018/0060786 A1* | 3/2018 | Venkataraman | G06Q 30/016 |
| 2018/0276676 A1* | 9/2018 | Zafar | G06Q 10/06398 |
| 2018/0278750 A1* | 9/2018 | Avila | H04M 3/5158 |
| 2019/0028588 A1* | 1/2019 | Shinseki | G06Q 10/10 |
| 2019/0138957 A1* | 5/2019 | Kane | G06Q 10/063114 |
| 2019/0361926 A1* | 11/2019 | Rogynskyy | G06Q 10/109 |

OTHER PUBLICATIONS

Everett, Hugh. "Generalized Lagrange Multiplier Method for Solving Problems of Optimum Allocation of Resources." Operations Research 11.3 (1963): 399-417. (Year: 1963).*

Chase, Jeffrey S., et al. "Managing energy and server resources in hosting centers." ACM SIGOPS operating systems review 35.5 (2001): 103-116. (Year: 2001).*

"12: Different Types of Process Mining," Process Mining: Data science in Action, Retrieved from the Internet: URL: https://www.coursera.org/lecture/process-mining/1-2-different-types-of-process-mining-G6am [Retrieved on Dec. 27, 2018].

* cited by examiner

ENTERPRISE DATA MINING SYSTEMS

TECHNICAL FIELD

Embodiments described herein generally relate to incident response, and more particularly, to providing utilizing enterprise data mining systems to determine and present optimized processes for incident response.

BACKGROUND

A variety of enterprise and/or information technology (IT) related software applications may be utilized to support various functions of an enterprise such as Finance, Human Resource (HR), IT, Legal, Marketing, Sales, and the like. The software applications may be deployed on an instance platform on a server and accessed as needed over a network such as a Local Area Network (LAN) or the Internet. The server may be a local enterprise server as part of a self-hosted system or a remote server located in the Cloud as part of a cloud computing system.

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method includes: receiving an incident notification and an indication of a first agent for the incident notification from a remote device, determining an assigned agent for the incident notification and a first incident type associated with the incident notification, determining an agent role for the first agent, selecting an optimal set of actions based on the first incident type and the agent role, wherein the optimal set of actions are selected from a subset of historic recorded agent interactions from a plurality of records associated with the incident type, and provide for presentation the optimal set of actions to the first agent.

In another embodiment, the method may be embodied in computer executable program code and stored in a non-transitory storage device. In yet another embodiment, the method may be implemented on a (cloud-based or self-hosted) computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
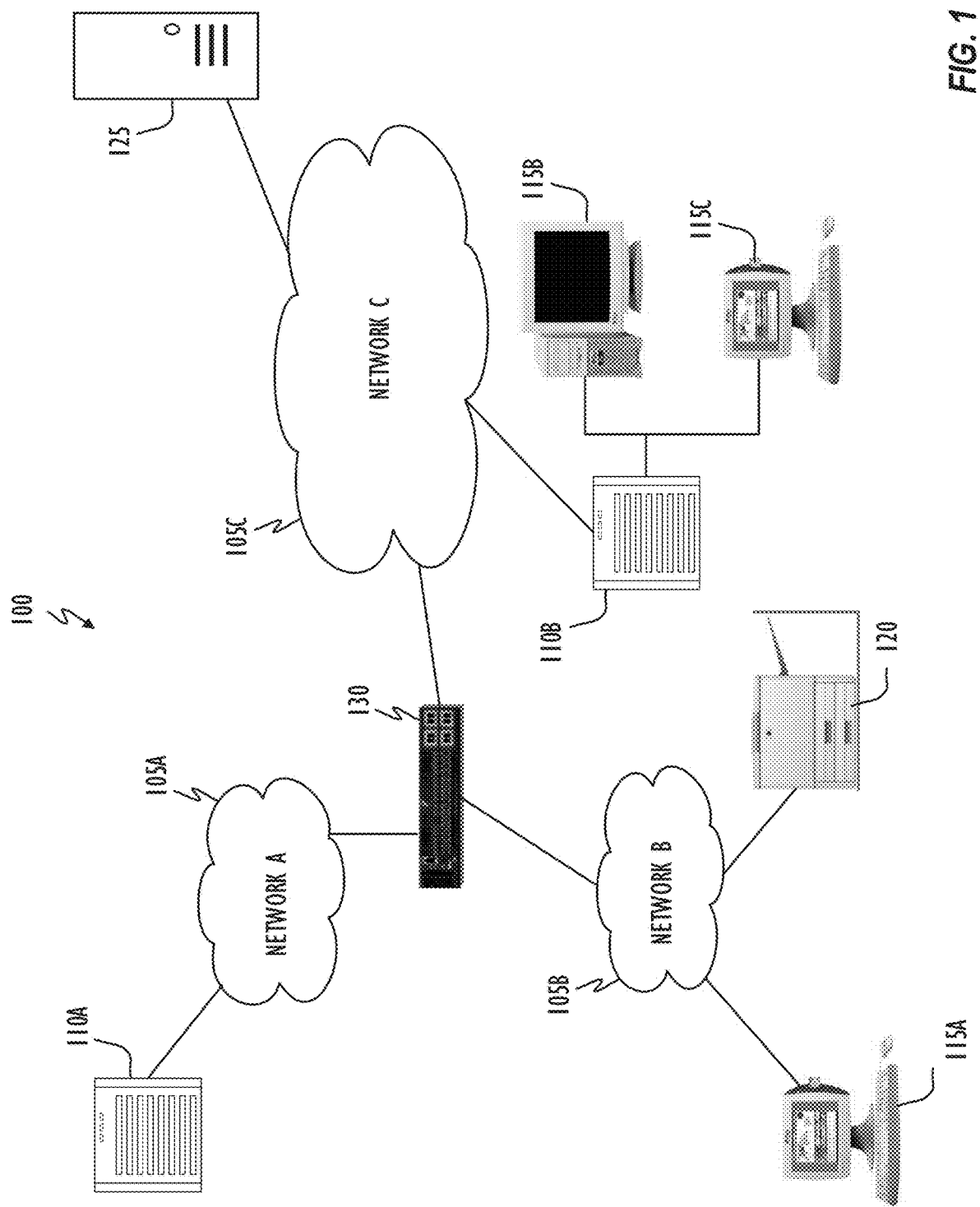
FIG. 1 illustrates a block diagram of self-hosted network system 100 where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other embodiments, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine hosted on one of more physical devices, virtual container hosted on one or more physical devices, host, server, laptop, tablet, and/or mobile device or to a plurality of electronic computing devices working together to perform the function described as being performed on or by the computing system.

As used herein, the term "medium" or "memory" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system or one or more hardware processors. Example embodiments of an application include software modules, software objects, software instances and/or other types of executable code.

As used herein, the term "incident" refers to any enterprise event in a managed network to be resolved by an agent. Embodiments may include events related to Finance, Human Resource (HR), IT, Legal, Marketing, Sales, and the like. In one or more embodiments, incidents may be associated with various levels or prioritizations.

This disclosure relates to providing optimized recommended processes for incident response using data mining, according to one or more embodiments. More specifically, over time, a system may collect records related to how an agent responds to an incident. Over time, the data collected from the records may be mined to determine an optimized response to a future occurrence of the incident. In one or more embodiments, an optimized process may take into considerations, such as a type of incident or a role of an agent responding to the incident. Further, the optimized response may also be based on contextual information, such as time of day, resource priority, and the like. According to one or more embodiments, the optimized series of steps may be utilized to train agents for responding to incidents. In one or more embodiments, the record data which is mined and the optimization processes may be unique to a customer enterprise, and multiple customer enterprises may be served by embodiments described herein.

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
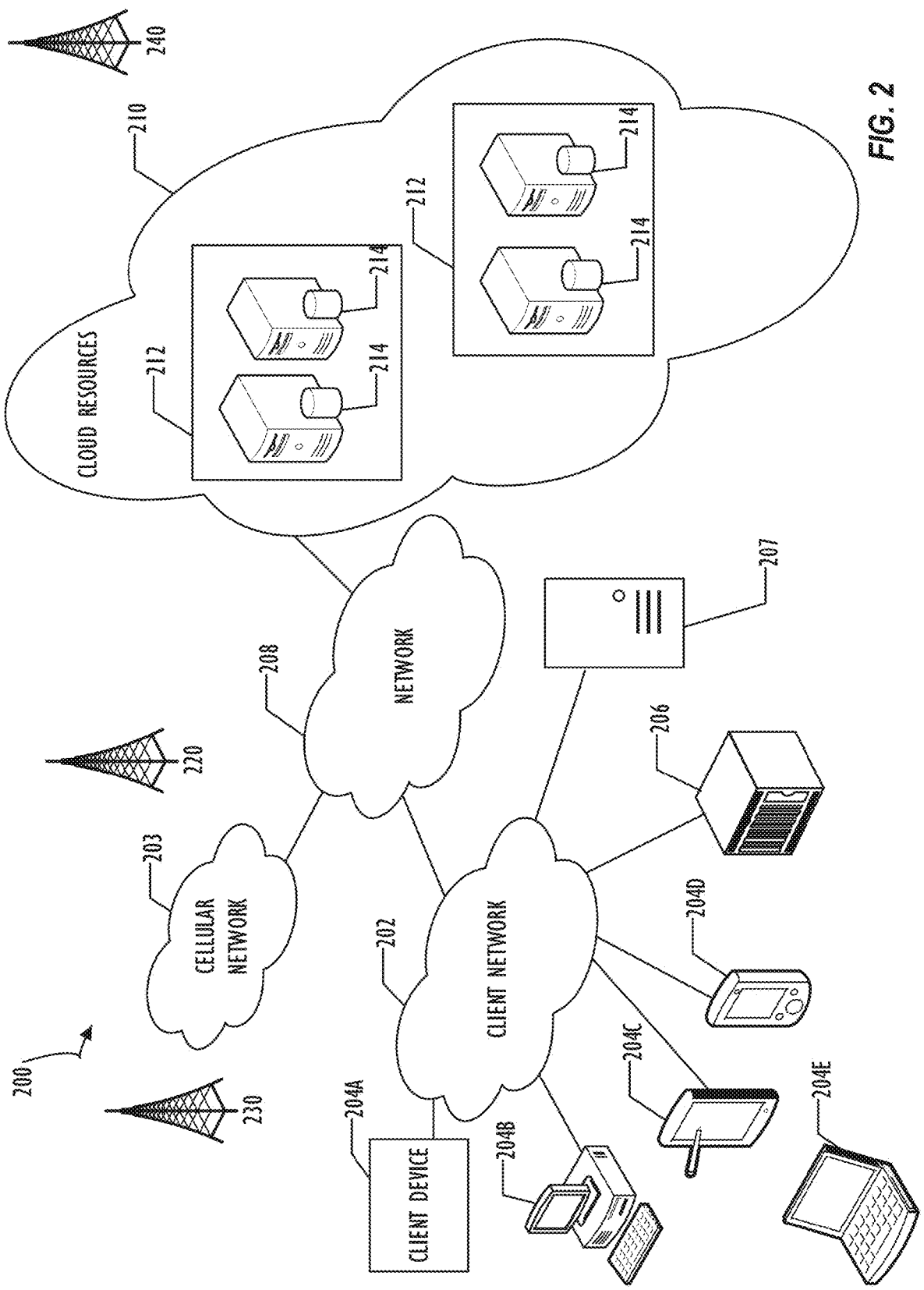
FIG. 2 illustrates a block diagram of cloud computing infrastructure 200 where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules.

Figure 3:
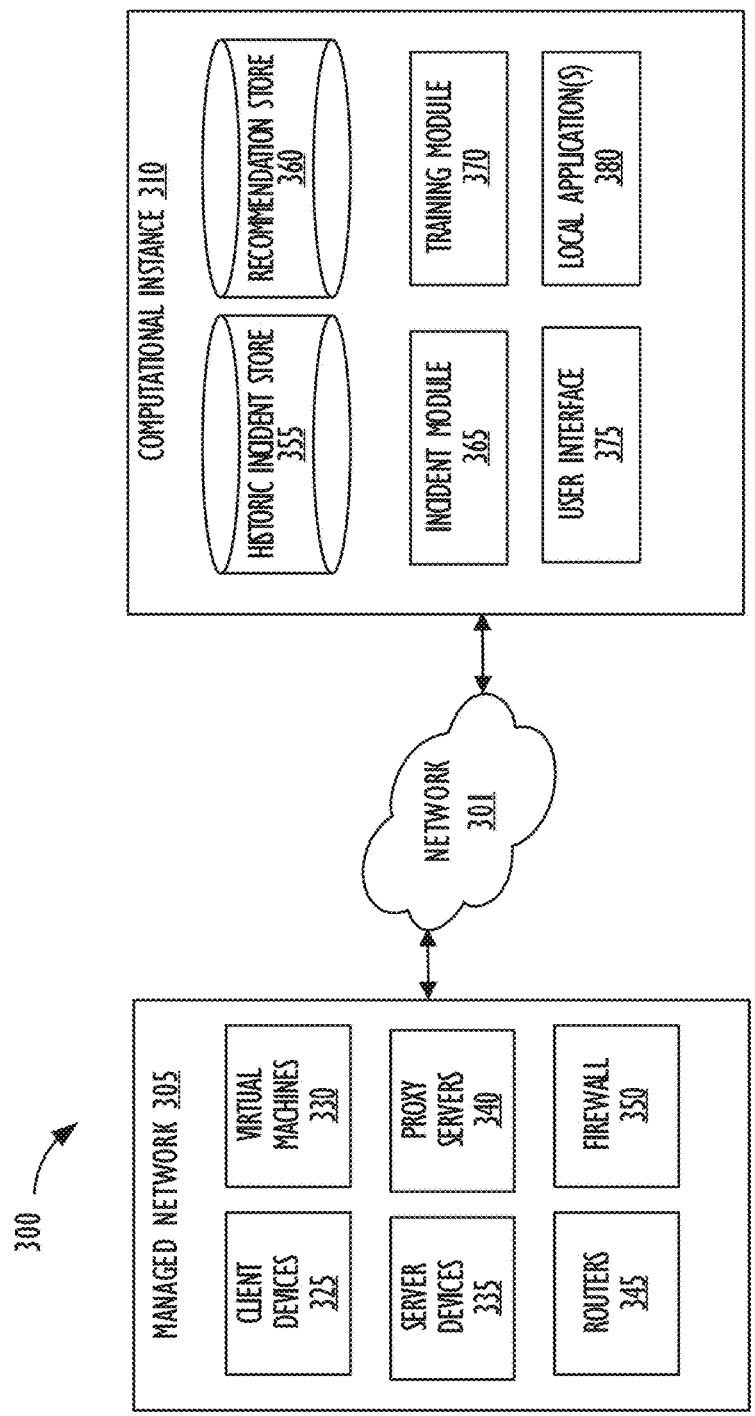
FIG. 3 illustrates a block diagram of a cloud architecture 300 where one or more embodiments of the present disclosure may operate.

FIG. 3 illustrates a block diagram of an embodiment of a cloud architecture 300 where embodiments of the present disclosure may operate. This architecture includes a managed network 305, which connects to a computational instance 310 over a network 301, such as the internet. Network 301 may be substantially similar to any of client network 102 and network 108, as described in FIG. 1, or client network 202 and network 208 of FIG. 2. Managed network 305 may be, for example, an enterprise network used by an entity for computing and communications tasks, as well as storage of data. Thus, managed network 305 may include various client devices 325, server devices 335, routers 345, virtual machines 330, firewall 350, and/or proxy servers 340. Client devices 325 may be embodied by client device 115 or 204, server devices 335 may be embodied by computing device 110 or 206, and routers 345 may be any type of router, switch, or gateway, for example. Although the various components are described as located in particular locations and with particular functionality, in one or more embodiments, the various modules may be differently located. Further, the functionality may be differently distributed across the network infrastructure 400 or in different locations not shown.

Virtual machines 330 may be embodied by one or more of the computing devices described above. In general, a virtual machine is an emulation of a computing system, and mimics the functionality (e.g., processor, memory, and communication resources) of a physical computer. One physical computing system, such as server 335, may support up to thousands of individual virtual machines. In some embodiments, virtual machines 330 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 350 may be one or more specialized routers or server devices that protect managed network 305 from unauthorized attempts to access the devices, applications, and services therein, while allowing authorized communication that is initiated from managed network 305. Firewall 350 may also provide intrusion detection, web filtering, virus scanning, application-layer gateways, and other applications or services.

Managed network 305 may also include one or more proxy servers 340. An embodiment of proxy servers 340 may be a server device that facilitates communication and movement of data between managed network 305 and computational instance 310. In particular, proxy servers 340 may be able to establish and maintain secure communication sessions with one or more computational instances 310 of an enterprise management system. By way of such a session, a user of computational instance 310 may be able to provide enterprise services for managed network 305.

Firewalls, such as firewall 350, typically deny all communication sessions that are incoming by way of Network 301, unless such a session was ultimately initiated from behind the firewall (i.e., from a device on managed network 305) or the firewall has been explicitly configured to support the session. By placing proxy servers 340 behind firewall 350 (e.g., within managed network 305 and protected by firewall 350), proxy servers 340 may be able to initiate these communication sessions through firewall 350. Thus, firewall 350 might not have to be specifically configured to support incoming sessions from computational instance 310, thereby avoiding potential security risks to managed network 305.

In some cases, managed network 305 may consist of a few devices and a small number of networks. In other deployments, managed network 305 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 305, a varying number of proxy servers 340 may be deployed therein. For example, each one of proxy servers 340 may be responsible for communicating with computational instance 310 regarding a portion of managed network 305. Alternatively or additionally, sets of two or more proxy servers may be assigned to such a portion of managed network 305 for purposes of load balancing, redundancy, and/or high availability.

Computation instance 310 may be part of a hosted environment that provides aPaaS services to users, particularly to the operators of managed network 305. These services may take the form of web-based portals, for instance. Thus, a user can securely access computational instance 310 from, for instance, client devices 325, or potentially from a client device outside of managed network 305. By way of the web-based portals, users may design, test, and deploy applications, generate reports, view analytics, and perform other tasks.

As shown in FIG. 3, computational instance 310 may represent a set of web portals, services, and applications (e.g., a wholly-functioning aPaaS system) available to a particular customer. In some cases, a single customer may use multiple computational instances. For example, managed network 305 may be an enterprise customer of an enterprise management system, and may use computational instance 310. The reason for providing multiple instances to one customer is that the customer may wish to independently develop, test, and deploy its applications and services. A computational instance may also be referred to as a hosted instance, a remote instance, a customer instance, or by some other designation.

In order to support multiple computational instances in an efficient fashion, the enterprise management platform may implement a plurality of these instances on a single hardware platform. For example, when the aPaaS system is implemented on a server cluster such as server cluster 110, it may operate a virtual machine that dedicates varying amounts of computational, storage, and communication resources to instances. But full virtualization of server cluster 110 might not be necessary, and other mechanisms may be used to separate instances. In some examples, each instance may have a dedicated account and one or more dedicated databases on server cluster 110. Alternatively, computational instance 310 may span multiple physical devices.

Computational instance 310 may include various modules and components that may be utilized to provide optimized processes for responding to incidents, according; to one or more embodiments. The computational instance 310 may include a historic incident store 355 which may store records of agent actions taken during the resolution of an incident. For example, an agent may utilize a user interface 375 to interact with local applications 380 or devices of the managed network 305 to resolve an incident. In one or more embodiment, an incident may be any enterprise event which needs to be resolved by an agent. For example, the incident may be related to the following applications and modules utilized by the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Enterprise Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

Computational instance 310 may also include an incident module 365 in one or more embodiments, the incident module 365 may perform data mining processes on the collected agent records in the historic incident store 355 in order to determine optimized processes and/or workflows for incident response for various incidents. The incident module 365 may analyze the historic records in historic incident store 355 to determine one or more optimal sets of steps for resolving a particular incident type. An optimal set of actions may require a particular skill set or certification by an agent (e.g., an agent role), so multiple optimal sets of steps may be determined for various levels of skill or certification. The agent role may indicate an assigned field, such as Finance, Human Resource (HR), IT, Legal, Marketing, Sales, and the like. The agent role may indicate more refined characteristics of a particular agent, such as years of experience, access to resources, skill level, and the like. As an example, multiple agents of various skill levels and having various roles may resolve similar incidents in different ways. By analyzing the recorded actions taken by each agent in resolving the similar incidents, the incident module 365 may determine a streamlined process for responding to the incident in the future. In addition, other contextual considerations may be made in determining multiple optimized processes for responding to an incident. Optimized processes may be determined, for example, based on a shortest expected completion time, and/or based on optimizing resources consumed in resolving the incident. As an example, the optimized set of actions may be selected to minimize completion time of the overall set of actions, or of individual steps in the optimized set of actions. For example, the selected set of steps may be based on recorded agent interactions which satisfy a predetermined threshold time, such as a quickest time, or a time under a set threshold, such as a completion goal time. The optimized processes may be stored, for example, in the recommendation store 360.

The computational instance 310 may also include a training module 370. The training module 370 may guide an agent to train the agent to respond to an incident in a more efficient manner. For example, the training module 370 may track actions taken by an agent in responding to an incident, and present notifications either suggesting next steps the agent may take or indicating a suggested step the agent should have taken after an action differs from a stored optimized process.

Figure 4:
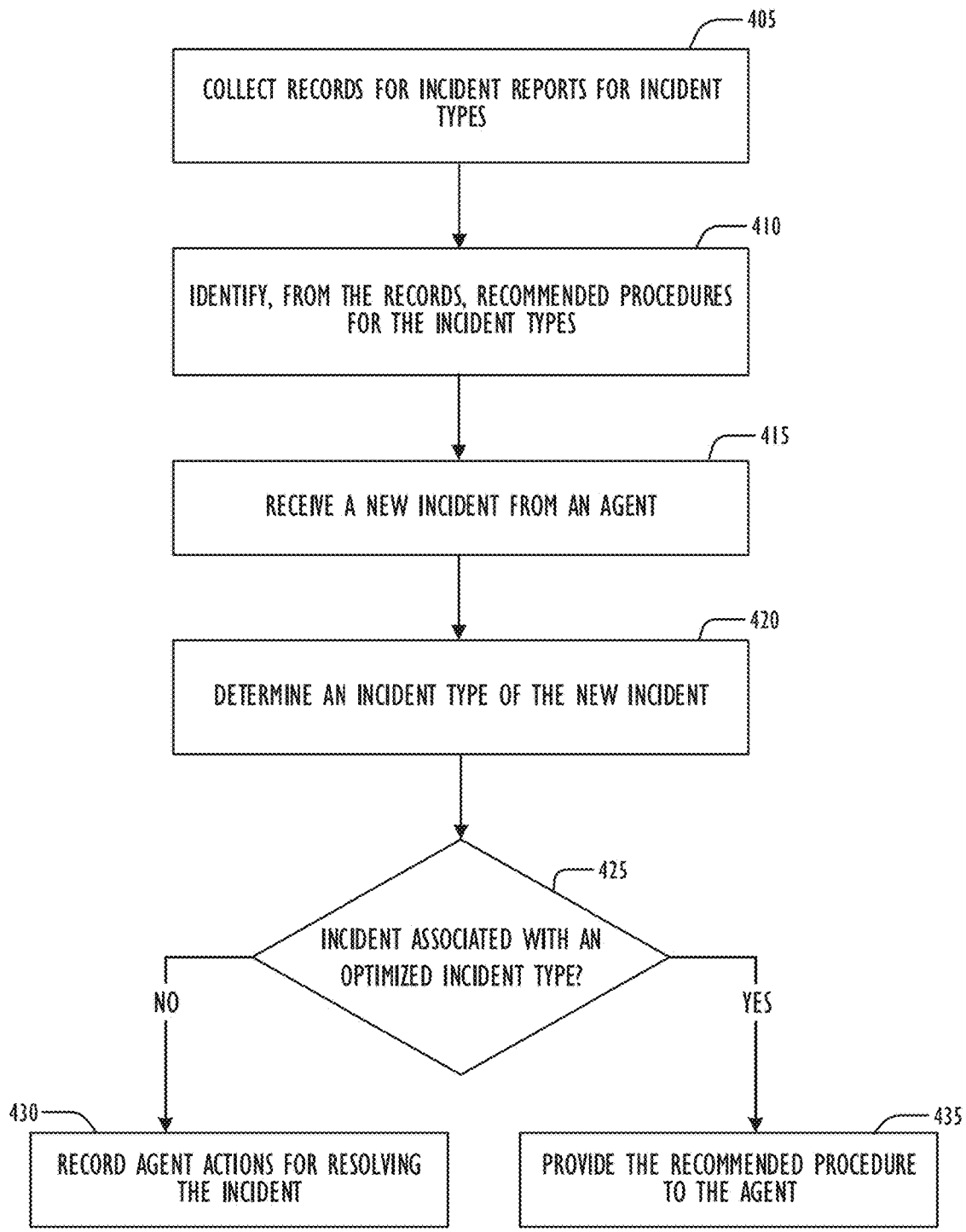
FIG. 4 illustrates a flowchart for providing a recommended procedure for an incident, according to one or more embodiments.

FIG. 4 illustrates a flowchart for providing a recommended procedure for an incident, according to one or more embodiments. Specifically, FIG. 4 depicts a method for providing recommended procedures to an agent in response to an incident. Although the flowchart in FIG. 4, and each of the following flowcharts, depicts a series of steps in a particular order, it should be understood that the various steps may be performed in a different order. Further, in each of the flowcharts depicted and described below, some of the steps may not be necessary to be performed. Moreover, some of the steps may be performed in parallel, according to one or more embodiments.

The flowchart begins at 405 where the incident module 365 collects records for incident reports for incident types. According to one or more embodiments, agents may be users of the managed system which may be tasked with performing various enterprise functions. Agents may be responsible for responding to incidents. As described above, an incident may be an IT event that needs resolution, such as a disruption, or an incident may refer to any enterprise functionality that needs to be addressed by a user. Over time, agents may respond to incidents in a variety of manners based on many factors, such as personal characteristics of the agent (e.g., skill level, certifications, personal preferences, and the like). Further, the agents may respond to various types of incidents. The incident module 365 may monitor agent actions taken in resolving the issue. In one or more embodiments, the incident module 365 may monitor agent actions in a passive way, such as by receiving input from a user describing the actions, or may more actively monitor the agent, such as by tracking agent interaction with a compute device. Each of the agent actions taken in resolving the incident may be recorded as a step or portion of a process for resolving the incident. the agent actions may be stored, for example, in historic incident store 355.

The flowchart continues at 410 and the incident module 365 identifies, from the records, recommended procedures for the incident types. The incident module 365 may identify the recommended procedure as an optimized series of steps to resolve the particular incident. The recommended procedure may be identified using a data mining procedure from the data stored in historic incident store 355. The optimized series of steps may include an optimized number of steps that need to be completed in order to resolve the incident, according to one or more embodiments. Additionally, or alternatively, the optimized series of steps may be determined based on other types of optimized characteristics, such as an optimized usage of resources, or an optimized completion time. Determination of the optimized series of steps will be described in further detail below with respect to FIG. 5.

At 415, the incident module receives a new incident from an agent. At 420, the incident module 365 determines an incident type of the new incident. The new incident may be automatically detected, or may be reported by a user of the managed network 305. Further, in one or more embodiments, the incident may be initiated by a user of the managed network 305. In one or more embodiments, natural language processing may be used to parse or analyze an incident report to determine the incident type. The determined incident type may indicate a type of issue to be resolved by the incident.

At 425, a determination is made regarding whether the incident is associated with an optimized incident type. For example, a determination may me made whether the determined incident type is associated with an optimized process, such has an optimized series of steps stored in recommendation store 360 in association with the determined incident type. As will be described in greater detail below with respect to FIG. 6, determining whether the incident is associated with an optimized incident type may be based on one or more of the incident type, agent characteristics, and other contextual information.

If a determination is made at 425 that the incident is not associated with an optimized incident type, then the flowchart continues at 430 and the incident module 365 records agent actions for resolving the incident. That is, in one or more embodiments, the incident module 365 may continue to collect data regarding agent actions during the resolution of the incident, and store the actions in the historic incident store 355.

Returning to 425, if a determination is made that the incident is associated with an optimized incident type, then the flowchart continues at 435, and the incident module 365 provides the recommended optimized procedure to the agent. As will be described in greater detail below with respect to FIG. 7, the recommended procedure may include the optimized series of steps identified at 410, and may be presented in a user interface 375 such that an agent tasked with the incident can easily view the steps that are recommended to be taken in order to resolve the incident.

Figure 5:
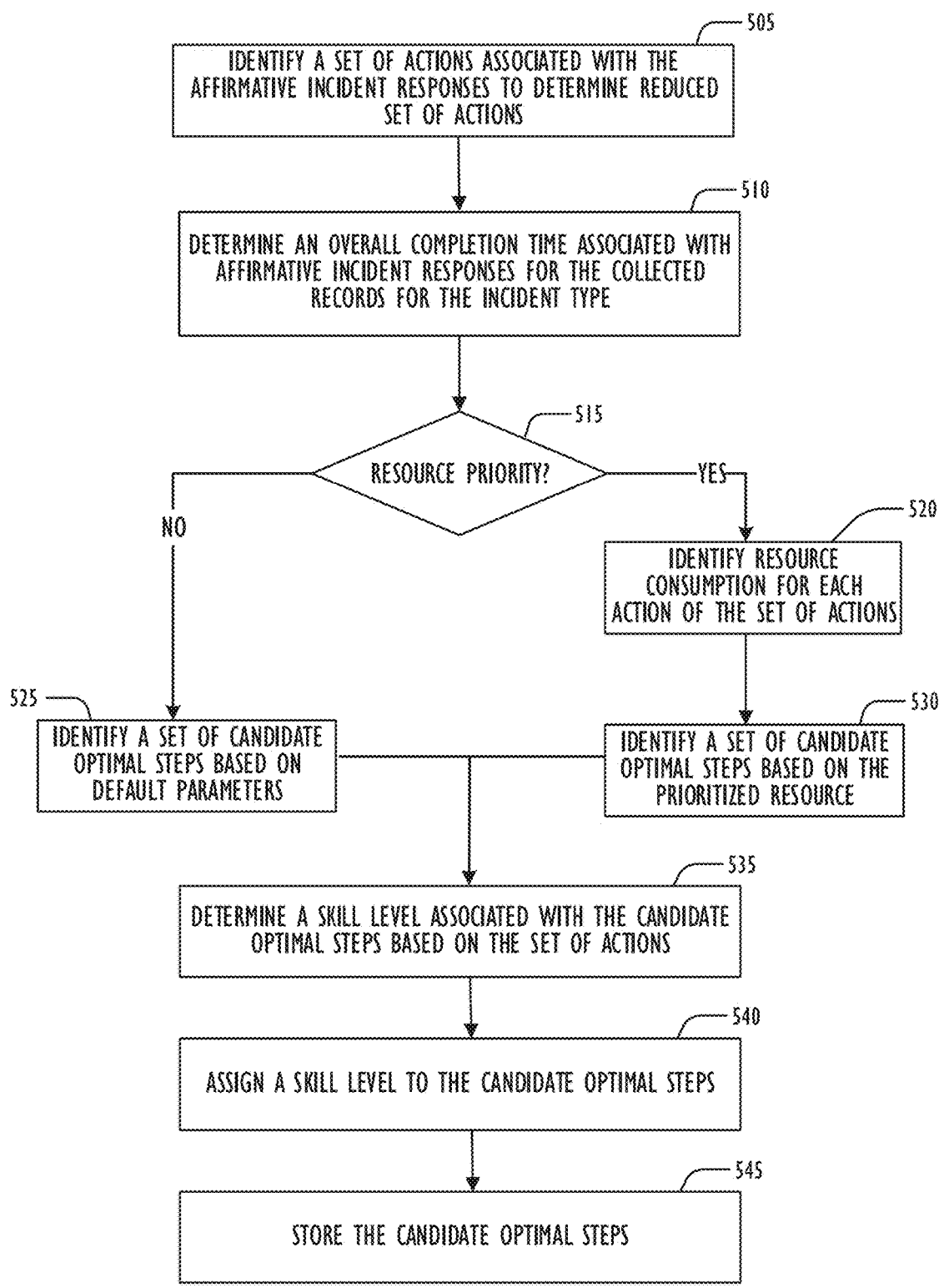
FIG. 5 shows a flowchart for determining a set of optimal steps for an incident type, according to one or more embodiments.

FIG. 5 shows a flowchart for determining a set of optimal steps for an incident type, according to one or more embodiments. As described above, the various steps described as part of FIG. 5 may be performed in a different order. In addition, some steps may be omitted, or performed in parallel, according to one or more embodiments. For purposes of clarity the description of FIG. 5 may refer back to components presented in FIG. 3.

The flowchart begins at 505 where the incident module 365 identifies a set of actions associated with the affirmative incident responses to determine a reduced set of actions. As described above, data mining may be utilized to reduce a number of steps taken by various agents to return a reduced number of steps. Said another way, the incident module 365 may analyze the records of the historic incident store 355 to identify and remove agent actions which are determined to be unnecessary or suboptimal in resolving an incident for a given incident type. Further, in one or more embodiments, the incident module 365 may determine that a series of steps may be reduced to fewer steps by substituting the series of steps with an alternate set of actions. The process of reducing the steps may initially begin by determining an initial set of optimal steps, for example, based on one or more records from one or more agents having affirmatively resolved the particular issue in the historic incident store 355. Further, in one or more embodiments, the incident module 365 may identify a subset of the series of actions in the records that are redundant, or which may be replaced by fewer steps. The result may be one or more candidate series of steps.

Continuing through the flowchart, at 510, the incident module 365 determines an overall completion time associated with affirmative incident responses for the collected records for the incident type. In one or more embodiments, the completion time may be determined for the reduced set of actions to complete the incident type. In one or more embodiments, the overall completion time may be determined for each of the candidate series of steps. That is, two or more candidate series of steps may be reduced to a same or similar number of steps.

At 515, a determination is made regarding whether resources should be prioritized. If a determination is made at 515 that resources should be prioritized, then the flowchart continues at 520, where the incident module 365 identifies a level of resource consumption for each step of the candidate series of steps. Resource consumption may be based on compute measurements, such as power usage, processing requirements, storage requirements, and the like. Further, in one or more embodiments, resource consumption may be based on manpower required to complete each candidate series of steps, monetary cost for each candidate series of steps, and the like. The flowchart continues at 530, and the incident module 365 identifies a set of candidate optimal steps based on the prioritized resource. Accordingly, the candidate optimal steps may be selected to satisfy a threshold level of resource consumption, or may be selected to utilize resources at a predetermined low level.

Returning to 520, if a determination is made that resources should not be prioritized, then the flowchart continues at 530 and the incident module 365 identifies a set of candidate optimal steps (e.g., an optimized process or an optimized set of actions) based on default parameters. For example, the default parameters may indicate that the set of candidate optimal steps may be determined based on a reduced number of steps as described above in 505.

The flowchart continues at 535, where the incident module 365 determines a skill level associated with the candidate optimal steps based on the set of actions. In one or more embodiments, some of the steps in the candidate optimal steps may only be available to certain agents. For example, a certain certification may be required to complete certain steps, or a certain agent role may be required to complete certain steps. As an example, resolution of the incident may require use of a functionality of a scoped application that is scoped to a particular agent role. At 540, the incident module 540 assigns the skill level to the candidate optimal steps. The flowchart concludes at 545, when the incident module 365 stores the candidate optimal steps. In one or more embodiments, the candidate optimal steps may be stored in the recommendation store 360.

Figure 6:
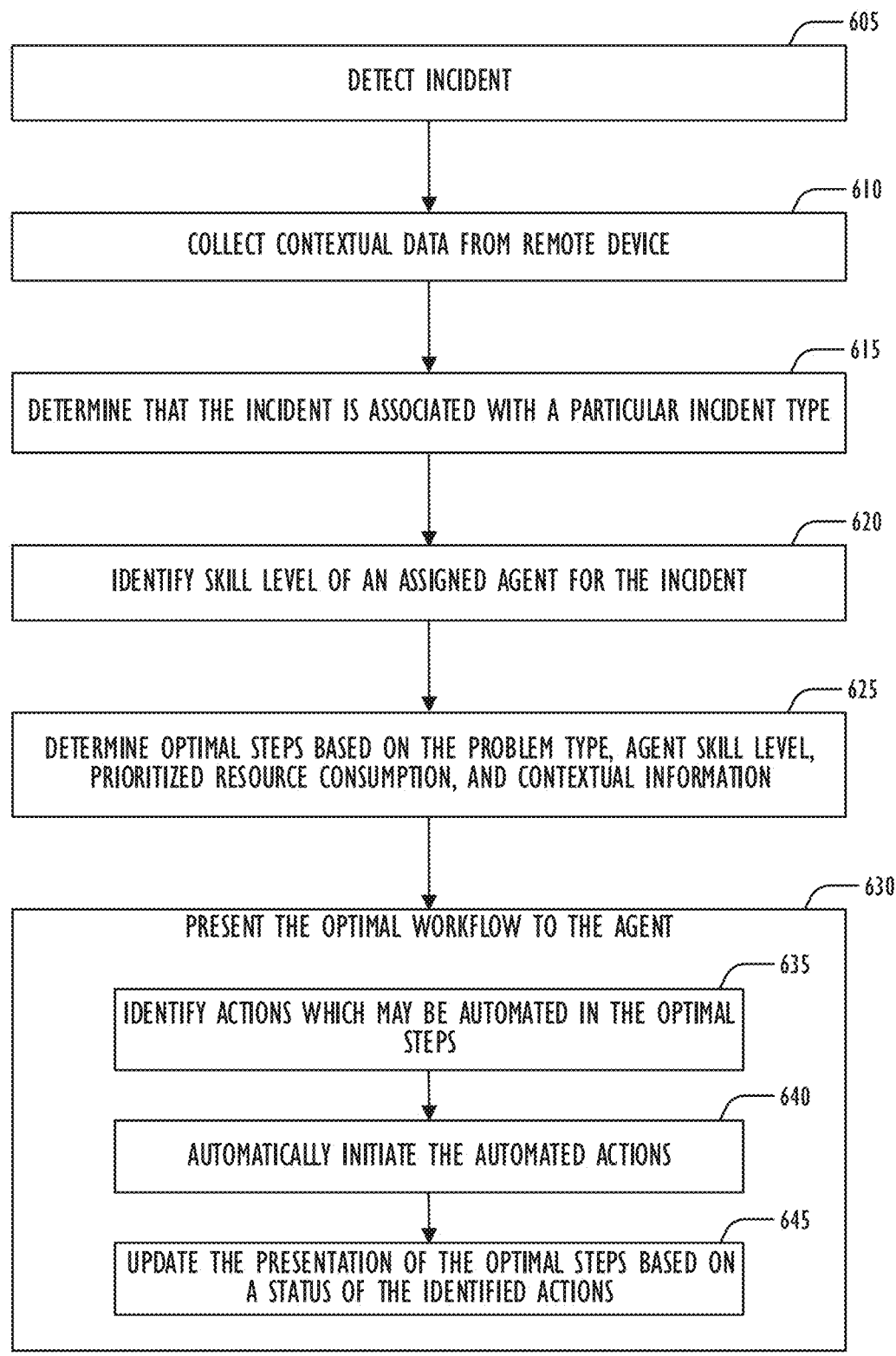
FIG. 6 shows a flowchart for providing a recommended procedure for an incident, according to one or more embodiments.

FIG. 6 shows a flowchart for providing a recommended procedure for an incident, according to one or more embodiments. As described above, the various steps described as part of FIG. 6 may be performed in a different order. In addition, some steps may be omitted, or performed in parallel, according to one or more embodiments. For purposes of clarity the description of FIG. 6 may refer back to components presented in FIG. 3.

The flowchart begins at 605, where the incident module 365 detects an incident has occurred. In one or more embodiments, the incident may be detected when an incident report is received from a user of the managed network 305. The flowchart proceeds to 610, where the incident module 365 collects contextual data from a remote device associated with the incident. For example, state information may be determined from applications or hardware that may impact the subject of the incident.

At 615, the incident module 365 determines that the incident is associated with a particular incident type. As described above, natural language processing may be used to identify the incident type from the incident report. In one or more embodiments, the natural language processing may be supplemented with the contextual information collected at 610 to more accurately identify the incident type. As described the above, the identified incident type may be specific enough to pinpoint an optimized set of actions to respond to the incident.

At 620, the incident module 365 identifies a skill level of an assigned agent for the incident. The skill level assigned to the agent may identify a role of the agent, certifications of the agent, resources available to the agent, and the like. The flowchart continues at 625, where the incident module 365 determines optimized steps based on the problem type, agent skill level, prioritized resource consumption, expected completion time, and contextual information. In one or more embodiments, the optimized steps may be selected based on one or more candidate set of optimized steps that satisfy a threshold parameter value, such as expected completion time, resource consumption, or the like. In one or more embodiments, multiple different optimized sets of steps maybe stored in the recommendation store 360 for a particular incident type, and an optimized set of actions may be selected based on the determined skill level, resource priority, and the like.

The flowchart proceeds to 630, where the incident module 365 presents the optimal workflow to the agent. Presenting the optimal workflow to the agent may include several steps. As depicted, presenting the optimal workflow to the agent may include, at 635, identifying actions which may be automated in the optimal steps. Specifically, the incident module 365 may identify one or more of the steps that may be directed by the computational instance 310 prior to presenting the optimized steps to the agent. Then, at 640, automatically initiating the automated actions. In one or more embodiment, some of the automated actions may include, for example, obtaining state information from the managed network 305, automatically sending alerts to other users, initiating applications, and the like.

Finally, the flowchart concludes at 645, where the incident module 365 updates the presentation of the optimal steps based on a status of the identified actions. As will be described in greater detail with respect to FIG. 7, the optimal steps may be presented in a user interface with an indication as to which of the steps have been automated. Accordingly, the presentation may signal to the agent which steps have been addressed, and which remain to be performed by the agent.

Figure 7:
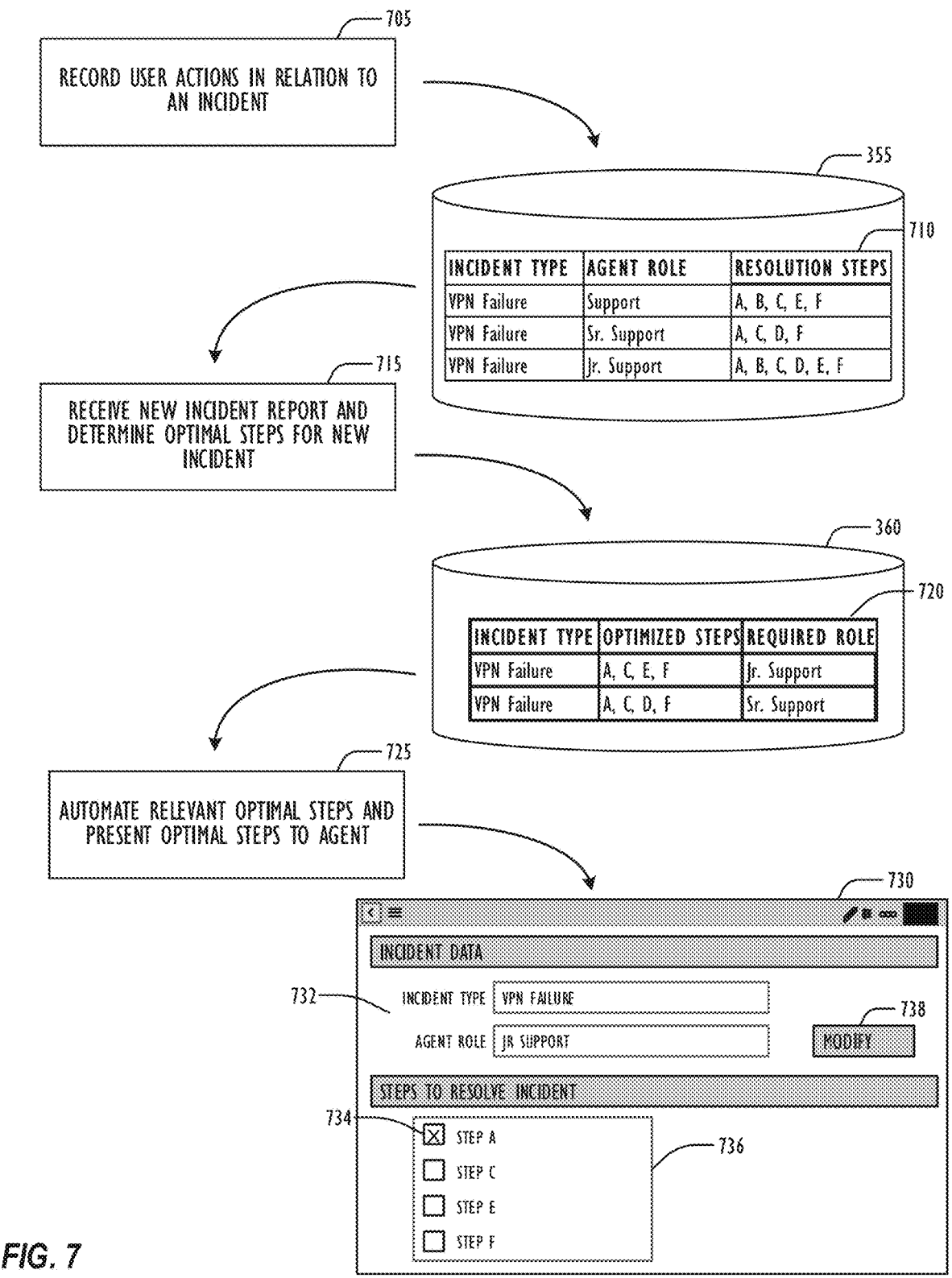
FIG. 7 shows a flow diagram illustrating a method for providing a recommended procedure for an incident using data mining, according to one or more embodiments.

FIG. 7 shows a flow diagram illustrating a method for providing a recommended procedure for an incident using data mining, according to one or more embodiments. As described above, the various actions described as part of FIG. 7 may be performed in a different order. In addition, some steps may be omitted, or performed in parallel, according to one or more embodiments. For purposes of clarity the description of FIG. 7 may refer back to components presented in FIG. 3.

The flow diagram begins at 705, where the incident module 365 records user interactions in relation to an incident. For purposes of this example, the user actions recorded all relate to a VPN failure. As shown, the user actions may be recorded in a historic incident table 710. The historic incident table 710 may be stored, for example, in historic incident store 355. It should be understood that the historic incident table 710 is presented merely for purposes of an example of one or more embodiments, and is not intended to limit the disclosure to the particular features presented and described with respect to historic incident table 710. For example, in one or more embodiments, the historic incident table 710 may include additional values, or alternative values. Further, not all values described with respect to historic incident table 710 may be necessary, according to one or more embodiments. In one or more embodiments, a historic incident table may store records of agent actions in resolving incidents for a particular incident type, or one table may store records of agent actions in resolving incidents for multiple incident types.

As depicted, the example historic incident table includes three records related to resolution of incidents of a VPN Failure incident type. Each record may include parameters describing agent characteristics, such as role or skill. For purposes of the example, the historic incident table 710 includes an agent role for each agent that resolved the incident. Further, each record includes a series of steps undertaken by the agent to resolve the VPN Failure issue. The steps are depicted as alphabetical characters for ease of explanation, but may actually include actions taken by an agent in resolving a VPN failure. For example, the steps may include checking an internet connection, confirming authentication credentials, and the like. For purposes of the example historic incident table 710, the first incident is depicted as being handled by an agent with a Support role, who has taken steps A, B, C, E, F. The second incident is depicted as being handled by an agent with a Sr. Support role, who has taken steps A, C, D, F. The third incident is depicted as being handled by an agent with a Jr. Support role, who has taken steps A, B, C, D, E, F.

The flow diagram continues at 715, where the incident module 365 receives a new incident report and determines optimal steps for the new incident. The new incident may be received in the form of an incident report or other type of notification for which natural language processing may be applied to identify the incident type. In one or more embodiments, as depicted, the incident module 365 may reference an optimization table 720, for example from recommendation store 360. Thus, in the example depicted in FIG. 7 the optimization table 720 includes optimized series of steps for resolving a VPN failure.

According to one or more embodiments, the optimized table 720 may be obtained by data mining the historic incident table 710. As described above, the optimization table 720 may include multiple series of optimized steps. The optimized series of steps may be determined by analyzing the resolution steps in one or more of the records in the historic incident table 710 to reduce the number of steps. Here, two candidate optimized series of steps are identified based on the historic incident table 710. As described above, determining the optimized series of steps for the incident type (e.g., "VPN Failure") may involve reducing a number of steps required by replacing a sub-series of steps with an alternative, less involved procedure, or removing steps that are determined to be redundant or otherwise unnecessary. In addition, other considerations may be utilized in identifying optimized series of steps. For example, the second record of the historic incident table 710 shows that a Sr. Support agent resolved a VPN failure through a series of four steps ("A, C, D, F"). However, it's possible that the step D can only be performed without step B by a Sr. Support agent. As an example, step B might be contacting a Sr. Support agent who is certified to aid in performing step D. Thus, the first optimized set of actions for resolving a VPN failure as depicted in optimization table 720 may show an optimized set of actions "A, C, D, F," but indicate that the optimized set of actions requires a Sr. Support role. Accordingly, the incident module 365 may include an optimized set of actions for resolving a VPN failure for a lower threshold skill level. Here, the optimization table 720 indicates an optimized set of actions "A, C, E, F." which may only require a Jr. Support role. For example, step E may be an alternative task to step D, which may take longer than D, but require a lower skill level or different role. In one or more embodiments, the "required role" portion of the table may indicate a threshold skill level required by an agent to utilize the optimized set of actions. Thus, although the required role is listed as "Jr. Support," a more senior support agent may also utilize the optimize set of actions, according to one or more embodiments. Although not depicted, the optimization table may rank the optimized set of actions such that an optimal series of steps may be identified for a particular role or skill set.

At 725, the incident module 725 automates the relevant optimal steps and presents the set of optimal steps to the agent. For purposes of this example, a Jr. Support agent may be assigned to manage the task. Thus, the first set of optimized steps from optimization table 720 may be utilized, which includes steps A, C, E, F. One or more of the steps may be determined by the incident module 365 that can be addressed without user interaction from the agent. For example, step A may be "check the network connection," and the incident module 365 may automatically check a network connection between a client device from which the VPN Failure has arisen.

User interface 730 depicts an example user interface on which the optimal steps may be presented to an agent to assist in resolving the incident. The user interface 730 may include, for example, an incident data portion 732, and a recommendation portion 736. The incident data portion may show information such as the determined incident type (e.g., "VPN Failure") and an agent role, or otherwise an indication of the agent's skill set or resources (e.g., "Jr. Support"). According to one or more embodiments, the user interface 730 may provide a user input module 738 that allows the agent to modify the determined incident type and agent role (or otherwise indicated skill level). In one or more embodiments, the recommendation portion 736 may include indications 734 of recommended steps which have been automated (e.g., "Step A") and thus are complete. Thus, the Jr. Agent utilizing the user interface 730 may simply follow the remaining optimized steps to resolve the VPN failure.

The improvement to the user interface 730 allows an agent to address enterprise issues in an optimized manner, enhancing the performance of the enterprise system. As shown, prior to the use of the optimized steps, a junior agent would perhaps run through steps "A, B, C, D, E, F," in order to resolve a VPN Failure, but by utilizing embodiments herein, a junior agent can simply use steps "A, C, E, F," thereby preserving time and/or resources in enhancing the functionality of the managed network.

Figure 8:
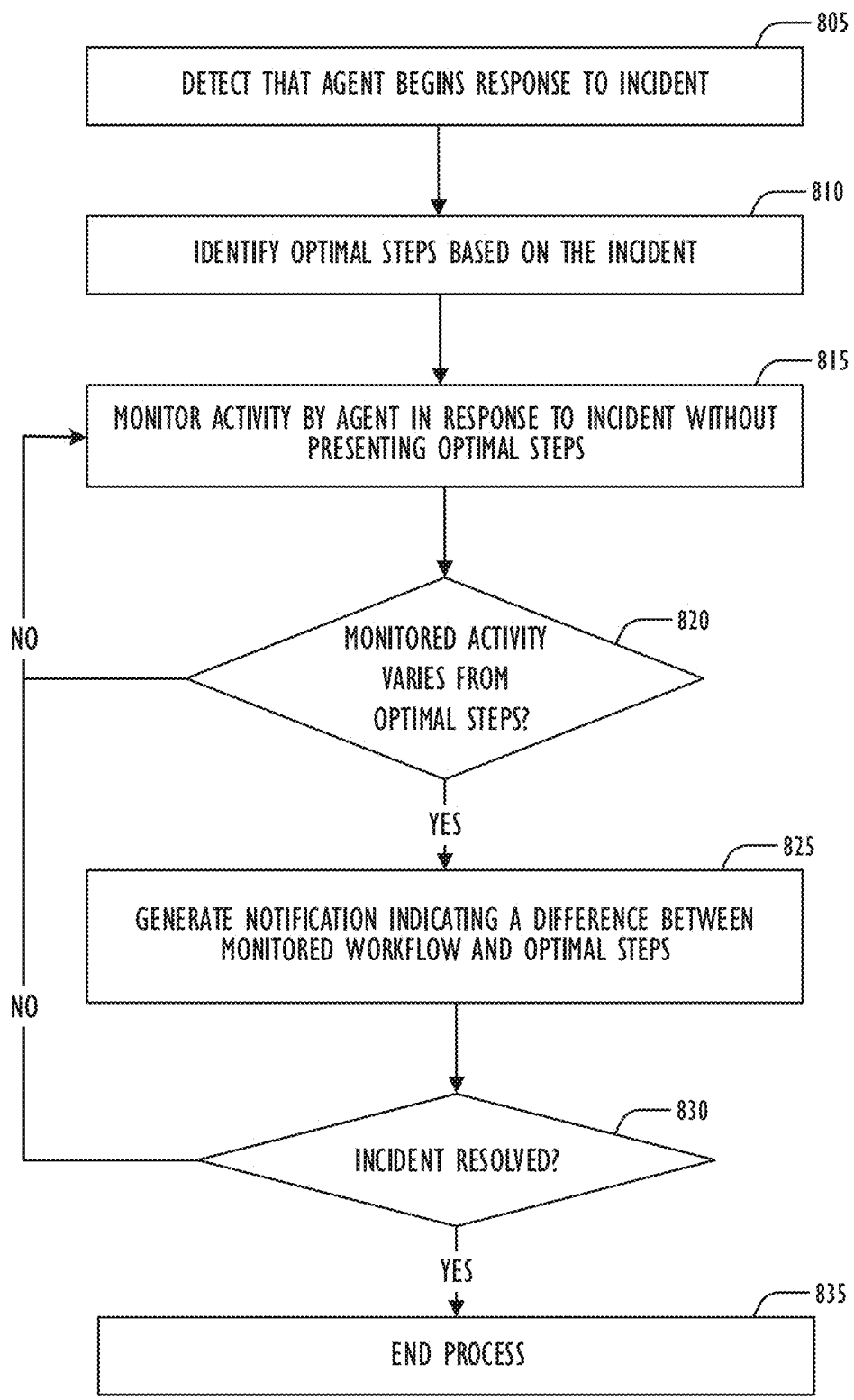
FIG. 8 shows a flowchart for providing a training technique for responding to an incident, according to one or more embodiments.

FIG. 8 shows a flowchart for providing a training technique for responding to an incident, according to one or more embodiments. As described above, the various steps described as part of FIG. 8 may be performed in a different order. In addition, some steps may be omitted, or performed in parallel, according to one or more embodiments. For purposes of clarity the description of FIG. 8 may refer back to components presented in FIG. 3.

The flowchart begins at 805 where the training module 370 detects that an agent has begun responding to an incident. In one or more embodiments, the training module 370 may detect that the agent has begun responding to the incident, for example, when an agent is assigned to respond to an incident. Further, in one or more embodiments, the training module 370 may detect that an agent has begun resolving an incident based on an agent working on an incident report.

The flowchart continues at 810, where the training module 370 identifies a set of optimal steps based on the incident. In one or more embodiments, the set of optimal steps for the agent may be identified from the optimization table 720 and may be based on an agent role or skillset of the assigned agent. At 815, the training module 370 monitors activity by the agent in response to the incident without presenting the optimal steps. In one or more embodiments, the training module may compare actions taken by the agent to the optimized set of actions, and may either guide the agent on a user interface to complete each of the optimized set of actions, or may simply monitor the agent actions for a disparity from the optimized set of actions.

At 820, a determination is made regarding whether the monitored activity varies from the optimal steps. If at 820 the monitored activity does not vary from the optimal steps, then the flowchart continues at 815 and the training module 370 continues to monitor activity by the agent.

Returning to 820, if a determination is made that the monitored activity varies from optimal steps, then the flowchart continues at 825 and the training module 370 generates a notification indicating the difference between the monitored workflow and the optimal steps. The notification may be displayed or otherwise presented to an agent as part of a user interface. In one or more embodiments, the notification may simply indicate that the agent has performed an action that is not part of the optimal set of actions. Additionally, or alternatively, the notification may include a suggestion of one or more of the optimized steps that the agent should take. Further, in one or more embodiments, the user interface may provide additional information, such as knowledge articles, to provide an educational opportunity to the agent to understand why the steps taken are not part of the optimized set of actions.

The flowchart continues at 830 and a determination is made regarding whether the incident has been resolved. If the incident has not been resolved, then the flowchart continues at 815 and the training module 370 continues to monitor activity by the agent. If, at 830, a determination is made that the incident is resolved, then the flowchart concludes at 835 and the process ends.

Figure 9:
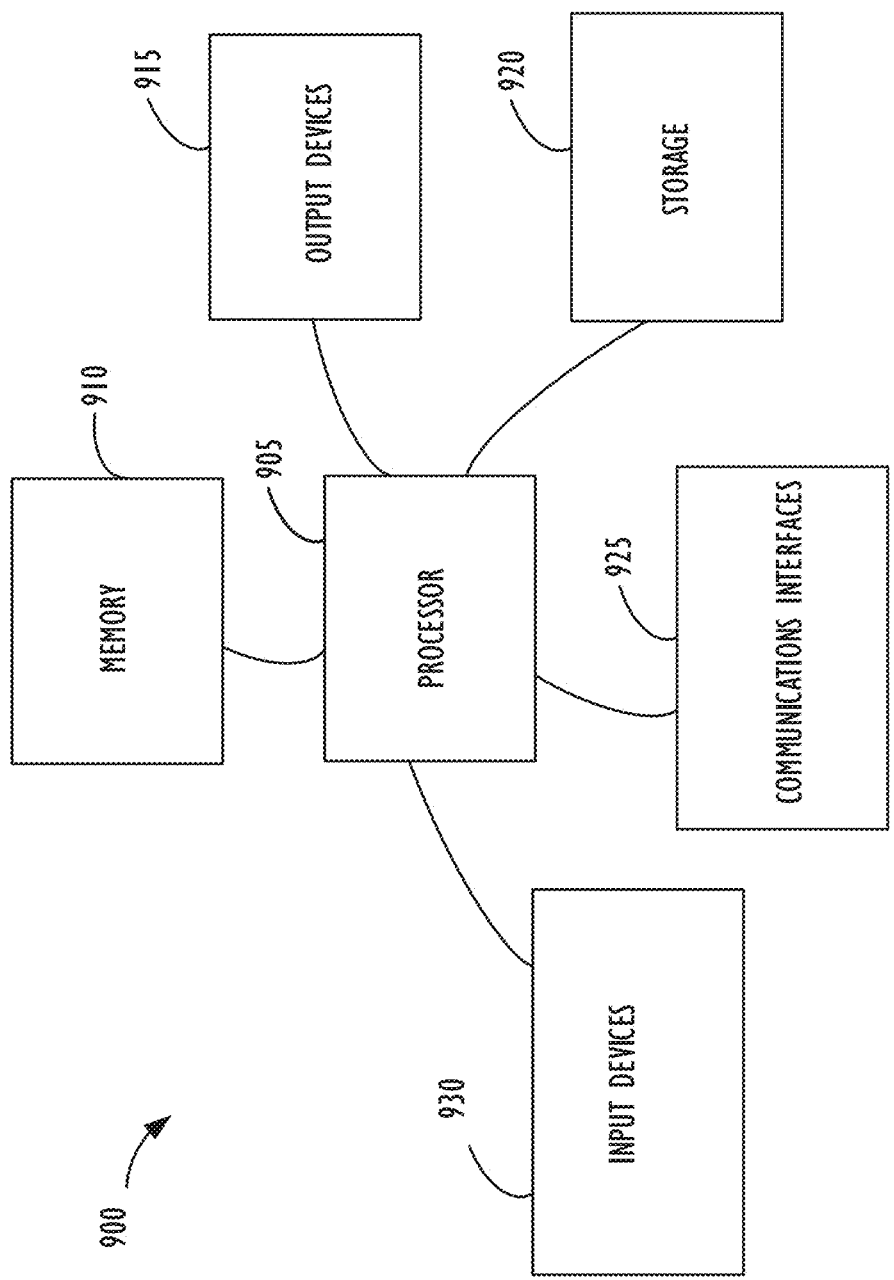
FIG. 9 illustrates a high-level block diagram 900 of a processing device (computing system) that may be used to implement one or more disclosed embodiments.

FIG. 9 illustrates a high-level block diagram 900 of a processing device (computing system) that may be used to implement one or more disclosed embodiments (e.g., data server computers 110, client computers 115, cloud resources platform/network 210, client devices 204A-204E, computational instance 310, server instances 214, managed network 305, etc.). For example, computing device 900 illustrated in FIG. 9 could represent a client device or a physical server device and include either hardware or virtual processor(s) depending on the level of abstraction of the computing device. In some examples (without abstraction) computing device 900 and its elements as shown in FIG. 9 each relate to physical hardware and in some examples one, more, or all of the elements could be implemented using emulators or virtual machines as levels of abstraction. In any case, no matter how many levels of abstraction away from the physical hardware, computing device 900 at its lowest level may be implemented on physical hardware. As also shown in FIG. 9, computing device 900 may include one or more input devices 930, such as a keyboard, mouse, touchpad, or sensor readout (e.g., biometric scanner) and one or more output devices 915, such as displays, speakers for audio, or printers. Some devices may be configured as input/output devices also (e.g., a network interface or touchscreen display). Computing device 900 may also include communications interfaces 925, such as a network communication unit that could include a wired communication component and/or a wireless communications component, which may be communicatively coupled to processor 905. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 9, processing device 900 includes a processing element such as processor 905 that contains one or more hardware processors, where each hardware processor may have a single or multiple processor cores. In one embodiment, the processor 905 may include at least one shared cache that stores data (e.g., computing instructions) that are utilized by one or more other components of processor 905. For example, the shared cache may be a locally cached data stored in a memory for faster access by components of the processing elements that make up processor 905. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs).

FIG. 9 illustrates that memory 910 may be operatively and communicatively coupled to processor 905. Memory 910 is a non-transitory medium configured to store various types of data. For example, memory 910 may include one or more volatile devices such as random access memory (RAM). Non-volatile storage devices 920 can include one or more disk drives, optical drives, solid-state drives (SSDs), tap drives, flash memory, read only memory (ROM), and/or any other type memory designed to maintain data for a duration time after a power loss or shut down operation. In certain embodiments, the non-volatile storage devices 920 may be used to store overflow data if allocated RAM is not large enough to hold all working data. The non-volatile storage devices 920 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900.

A user interface (e.g., output devices 915 and input devices 930) can include a display, positional input device (such as a mouse, touchpad, touchscreen, or the like), keyboard, or other forms of user input and output devices. The user interface components may be communicatively coupled to processor 905. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 900 may comprise other components well known in the art, such as sensors, powers sources, and/or analog-to-digital converters, not explicitly shown in FIG. 9.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A non-transitory computer readable medium comprising computer readable code executable by one or more processors to:

monitor, via an incident module of a computational instance of a managed network, agent interactions addressing a plurality of incidents associated with the managed network;

store a plurality of records indicative of the agent interactions in a historic incident store;

data mine, via the incident module, the plurality of records to determine respective optimal sets of actions that are expected to resolve each of the plurality of incidents;

store indications of the respective optimal sets of actions in a recommendation store;

receive, from a remote device of the managed network, an incident notification and an indication of an assigned agent for the incident notification, wherein the incident notification is indicative of an incident of the plurality of incidents associated with the managed network;

determine, via the incident module and using natural language processing, a first incident type from an incident report associated with the incident notification;

determine, via the incident module, an agent role for the assigned agent;

in response to the first incident type and the agent role matching a subset of records of the plurality of records in the historic incident store, determine a level of resource consumption associated with each record of the subset of records, wherein the level of resource consumption is indicative of power usage, processing requirements, or storage requirements, or any combination thereof;

select, from the respective optimal sets of actions, an optimal set of actions that is expected to resolve the incident based on the agent role and the level of resource consumption associated with each record of the subset of records of the plurality of records in the historic incident store, wherein the optimal set of actions satisfy a threshold level of resource consumption;

monitor, via the incident module, a current set of actions undertaken by the assigned agent in response to the incident;

in response to determining that the current set of actions differs from the optimal set of actions, generate a notification indicative of the optimal set of actions; and provide, for presentation via a user interface of an additional computational instance of the managed network, the notification indicative of the optimal set of actions to the assigned agent.

2. The non-transitory computer readable medium of claim 1, comprising computer readable code executable by the one or more processors to:

detect an action of the optimal set of actions that may be automated; and automatically perform the action prior to providing the optimal set of actions for presentation.

3. The non-transitory computer readable medium of claim 2, wherein the action is indicated as complete in the presentation of the optimal set of actions.

4. The non-transitory computer readable medium of claim 1, wherein each action of the optimal set of actions is associated with an expected completion time, and wherein the optimal set of actions is selected based on a minimized threshold completion time, or a predetermined threshold amount of time, or both.

5. The non-transitory computer readable medium of claim 1, wherein the optimal set of actions is associated with a combination of a set of actions that reach an affirmative incident response and utilize resources at a predetermined low level.

6. The non-transitory computer readable medium of claim 1, wherein the computer readable code executable by the one or more processors to provide for presentation the optimal set of actions to the assigned agent comprises computer readable code executable by the one or more processors to:

determine a skill level associated with the assigned agent, and select the optimal set of actions from the respective optimal sets of actions based on the determined skill level associated with the assigned agent.

7. The non-transitory computer readable medium of claim 1, comprising computer readable code executable by the one or more processors to determine the first incident type via contextual information associated with the incident, or both.

8. The non-transitory computer readable medium of claim 1, wherein the historic incident store comprises a historic incident table, wherein the historic incident table comprises the plurality of records, and wherein each record of the plurality of records comprises a set of actions of the monitored agent interactions taken by a historic agent in response to a historic incident, a historic agent role of the historic agent, and a length of time to complete the set of actions.

9. The non-transitory computer readable medium of claim 1, wherein the incident is related to a VPN failure, and wherein the optimal set of actions are expected to resolve the VPN failure.

10. The non-transitory computer readable medium of claim 1, comprising computer readable code executable by the one or more processors to:

in response to the first incident type and the agent role not matching the subset of records of the plurality of records, generate additional records indicative of interactions taken by the assigned agent for resolution of the incident; and store the additional records in the historic incident store.

11. The non-transitory computer readable medium of claim 1, comprising computer readable code executable by the one or more processors to:

identify one or more records of the subset of records that are redundant; and remove the one or more records from the subset of records to generate the optimal set of actions.

12. A system for determining an optimal set of actions, comprising:

one or more processing devices; and a computer readable medium comprising computer readable code for an incident module of a computational instance of a managed network, the computer readable code executable by one or more processors to:

monitor, via the incident module, agent interactions addressing a plurality of incidents associated with the managed network;

store a plurality of records indicative of the agent interactions in a historic incident store;

data mine, via the incident module, the plurality of records to determine respective optimal sets of actions that are expected to resolve each of the plurality of incidents;

store indications of the respective optimal sets of actions in a recommendation store;

receive, from a remote device of the managed network, an incident notification and an indication of an assigned agent for the incident notification, wherein the incident notification is indicative of an incident of the plurality of incidents associated with the managed network;

determine, via the incident module and using natural language processing, a first incident type from an incident report associated with the incident notification;

determine, via the incident module, an agent role for the assigned agent;

in response to the first incident type and the agent role matching a subset of records of the plurality of records in the historic incident store, determine a level of resource consumption associated with each record of the subset of records, wherein the level of resource consumption is indicative of power usage, processing requirements, or storage requirements, or any combination thereof;

select, from the respective optimal sets of actions, an optimal set of actions that is expected to resolve the incident based on the agent role and the level of resource consumption associated with each record of the subset of records of the plurality of records in the historic incident store, wherein the optimal set of actions satisfy a threshold level of resource consumption;

monitor, via the incident module, a current set of actions undertaken by the assigned agent in response to the incident;

in response to determining that the current set of actions differs from the optimal set of actions, generate a notification indicative of the optimal set of actions; and provide, for presentation via a user interface of an additional computational instance of the managed network, the notification indicative of the optimal set of actions to the assigned agent.

13. The system of claim 12, comprising computer readable code executable by the one or more processors to:

detect an action of the optimal set of actions that may be automated; and automatically perform the action prior to providing the optimal set of actions for presentation.

14. The system of claim 13, wherein the action is indicated as complete in the presentation of the optimal set of actions.

15. The system of claim 12, wherein the computer readable code executable by the one or more processors to provide for presentation the optimal set of actions to an agent comprises computer readable code executable by the one or more processors to:

determine a skill level associated with the assigned agent, and select the optimal set of actions from the respective optimal sets of actions based on the determined skill level associated with the assigned agent.

16. A method for determining optimal actions for a managed network, comprising:

monitoring, via an incident module of a computational instance of the managed network, agent interactions addressing a plurality of incidents associated with the managed network;

storing a plurality of records indicative of the agent interactions in a historic incident store;

data mining, via the incident module, the plurality of records to determine respective optimal sets of actions that are expected to resolve each of the plurality of incidents;

storing indications of the respective optimal sets of actions in a recommendation store;

receiving, from a remote device of the managed network, an incident notification and an indication of an assigned agent for the incident notification, wherein the incident notification is indicative of an incident of the plurality of incidents associated with the managed network;

determining, via the incident module and using natural language processing, a first incident type from an incident report associated with the incident notification;

determining, via the incident module, an agent role for the assigned agent;

in response to the first incident type and the agent role matching a subset of records of the plurality of records in the historic incident store, determine a level of resource consumption associated with each record of the subset of records, wherein the level of resource consumption is indicative of power usage, processing requirements, or storage requirements, or any combination thereof;

selecting, from the respective optimal sets of actions, an optimal set of actions that is expected to resolve the incident based on the agent role and the level of resource consumption associated with each record of the subset of records of the plurality of records in the historic incident store, wherein the optimal set of actions satisfy a threshold level of resource consumption;

monitoring, via the incident module, a current set of actions undertaken by the assigned agent in response to the incident;

in response to determining that the current set of actions differs from the optimal set of actions, generating a notification indicative of the optimal set of actions; and providing, for presentation via a user interface of an additional computational instance of the managed network, the notification indicative of the optimal set of actions to the assigned agent.

17. The method of claim 16, comprising:

detecting an action of the optimal set of actions that may be automated; and automatically performing the action prior to providing the optimal set of actions for presentation.

18. The method of claim 16, wherein each action of the optimal set of actions is associated with an expected completion time, and wherein the optimal set of actions is selected based on a minimized threshold completion time, or a predetermined threshold amount of time, or both.

* * * * *

UNITED STATES PATENT AND TRADEMARK OFFICE
CERTIFICATE OF CORRECTION

PATENT NO. : 11,308,429 B2
APPLICATION NO. : 16/255649
DATED : April 19, 2022
INVENTOR(S) : Ivan Rodrigo Garay and Erick Koji Hasegawa It is certified that error appears in the above-identified patent and that said Letters Patent is hereby corrected as shown below:

In the Claims

Column 19, Line 67, Claim 7, please delete the phrase ", or both".

Signed and Sealed this
Fifth Day of July, 2022

Katherine Kelly Vidal
*Director of the United States Patent and Trademark Office*